United States Patent [19]
Allyn

[11] Patent Number: 4,722,363
[45] Date of Patent: Feb. 2, 1988

[54] ADDITIVE INJECTION SYSTEM FOR FLUID TRANSMISSION PIPELINES

[75] Inventor: Daniel W. Allyn, Corona, Calif.

[73] Assignee: Atlantic Richfield Company, Los Angeles, Calif.

[21] Appl. No.: 870,602

[22] Filed: Jun. 4, 1986

[51] Int. Cl.$^4$ .............................. G05D 11/03
[52] U.S. Cl. .................. 137/599.1; 137/13; 137/888; 137/890
[58] Field of Search ......... 137/888; 137/890; 137/892 137/892, 13, 889, 891, 893, 895; 366/163, 167

[56] References Cited

U.S. PATENT DOCUMENTS

| | | | |
|---|---|---|---|
| 2,062,231 | 11/1936 | Ornstein | 137/890 X |
| 3,104,823 | 9/1963 | Hayes | 137/599.1 X |
| 3,150,676 | 9/1964 | Robinson | 137/896 X |
| 3,565,404 | 2/1971 | Reid | 366/167 X |
| 3,601,079 | 8/1971 | Giles | 137/599.1 X |
| 3,865,136 | 2/1975 | Verschuur | 137/896 |
| 4,173,178 | 11/1979 | Wieland | 137/599.1 X |
| 4,462,429 | 7/1984 | Coursen | 137/13 X |
| 4,513,767 | 4/1985 | Soederhuyzen | 137/268 |

FOREIGN PATENT DOCUMENTS

| | | | |
|---|---|---|---|
| 1491215 | 7/1967 | France | 137/888 |
| 515188 | 12/1971 | Switzerland | 137/891 |

*Primary Examiner*—Robert G. Nilson
*Attorney, Agent, or Firm*—Michael E. Martin

[57] ABSTRACT

A system for injecting fluid additive into a fluid transmission pipeline including a branch conduit in communication with the pipeline, a pump in the branch conduit for raising the pressure of fluid withdrawn from the pipeline, and an eductor having a branch passage in communication with the additive fluid for withdrawing the additive fluid from a source without increasing the pressure of the additive fluid to the branch conduit pressure or the nominal pipeline fluid pressure. A mixture of pipeline fluid and additive fluid are reinjected through an annular dispersion chamber interposed in the main pipeline. The additive fluid may be metered by a positive displacement flow meter or a metering valve which throttles the flow of additive fluid from a pressurized source.

7 Claims, 9 Drawing Figures

ADDITIVE INJECTION SYSTEM FOR FLUID TRANSMISSION PIPELINES

BACKGROUND OF THE INVENTION

1. Field of the Invention

The present invention pertains to a method and system for mixing a soluble polymeric drag reducing additive with a relatively high pressure liquid flowing through a transmission pipeline, or the like.

2. Background

Certain types of high molecular weight linear chain polymer substances have been determined to be effective in reducing the friction pressure losses incurred in pumping relatively viscous fluids, such as crude oil, through transmission pipelines. The injection of relatively small quantities of these drag reducing additives into high volume crude oil pipelines, such as the Trans-Alaska Pipeline System, can result in significant savings in pumping costs and fluid transmission time. One commercially successful type of drag reducing additive is manufactured and sold under the trademark FLO ® by Chemlink Petroleum, Inc., a subsidiary of the assignee of the present invention. However, certain problems are associated with pumping drag reducing additives and the injection of these additives into a pipeline to provide a competent drag reduction effect.

One problem associated with injecting polymer type drag reducing additives pertains to the lack of lubricity of the drag reducing additive itself. Accordingly, the use of high pressure metering pumps, such as Gear or lobe type pumps, for raising the pressure of the drag reducing additive for injection directly into the transmission pipeline results in a relatively short life of the injection or metering pump.

Another problem associated with the injection of the aforementioned type of drag reducing additive pertains to the degradation of the additive when subjected to sustained high velocity flow and the resultant shear forces acting on the additive material. In this regard, the injection of the material directly into the main fluid transmission line through jet nozzles and the like tends to degrade the drag reducing additive at the point of injection with almost instant loss of operating effectiveness.

Still further considerations in injecting polymer and other viscous type drag reducing additives pertains to the apparent ineffectiveness of the additive when it is not injected or mixed with the main fluid flow at a point near the inner wall surface of the fluid transmission pipeline, itself. However, the present invention provides a method and system for overcoming certain problems associated with the use of polymer type and certain other type relatively viscous fluid transmission pipeline additives.

SUMMARY OF THE INVENTION

The present invention provides an improved method and system for injecting a relatively viscous drag reducing additive into a fluid transmission pipeline and the like.

In accordance with one important aspect of the present invention, an improved system is provided for injecting a polymer type drag reducing additive wherein a portion of the fluid being pumped through a fluid transmission pipeline is circulated through a branch conduit which includes an eductor for entraining the drag reducing additive into the flow of the diverted portion of the transmission line fluid. A mixture of drag reducing additive and diverted fluid is then reinjected into the main fluid transmission line through an improved dispersion device.

In accordance with another important aspect of the present invention, a system for injecting polymer type drag reducing additive is provided wherein the drag reducing additive is metered by a pump or a metering valve in such a way that pressure of the drag reducing additive does not have to be increased by a mechanical pump whereby problems associated with rapid wear of such pumps may be avoided.

In accordance with yet another aspect of the present invention a drag reducing additive injection system is provided which minimizes the exposure of the drag reducing additive to sustained high flow velocities and the attendant degradation of the additive which otherwise can result from substantial shearing of the additive during the injection and mixing process.

The present invention still further provides an improved method of injecting a pipeline fluid drag reducing additive into a fluid transmission pipeline wherein minimal degradation of the drag reducing additive is encountered, improved dispersion of the additive into the main fluid flow is provided and greater overall effectiveness of the use of the drag reducing additive is obtained. Those skilled in the art will recognize the abovenoted features and advantages of the present invention, as well as other superior aspects thereof upon reading the detailed description in conjunction with the drawing.

DESCRIPTION OF PREFERRED EMBODIMENTS

Figure 1:
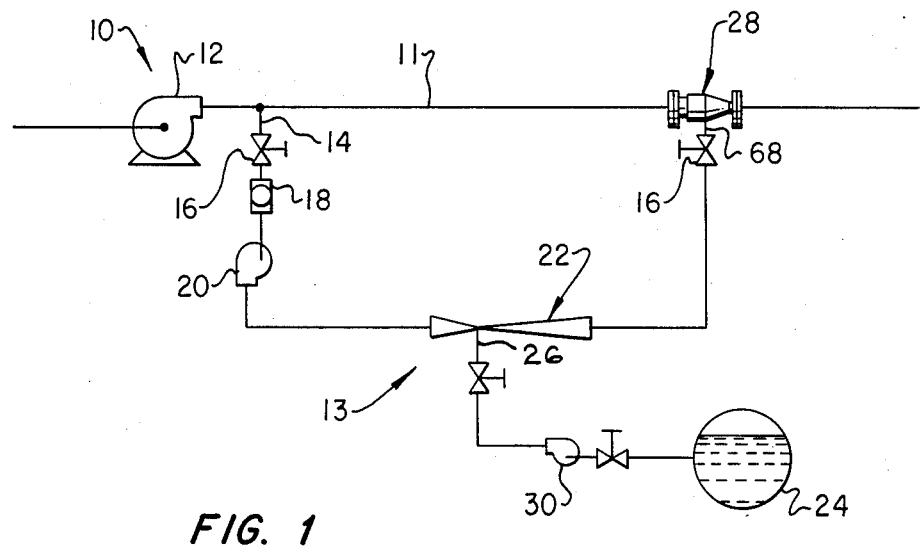
FIG. 1 is a schematic diagram of the improved additive injection system of the present invention.

In the description which follows, like parts are marked throughout the specification and drawing with the same reference numerals, respectively. The drawing figures are not necessarily to scale and certain features of the invention may be shown exaggerated in scale or in schematic form in the interest of clarity and conciseness.

Referring to FIG. 1, there is illustrated a portion of a fluid transmission pipeline system, such as a crude oil pipeline, generally designated by the numeral 10. The pipeline 10 includes one or more pumps 12 interposed therein for pumping fluid through a pipeline section 11. The resistance to flow of fluids such as crude oil and other relatively viscous liquids can result in a significant increase in pumping costs for long distance fluid transmission pipelines. In this regard, certain fluid additives have been developed which, when injected into the transmission pipeline, reduce the frictional drag of the primary fluid being pumped, to significantly reduce pumping costs. As previously mentioned, one type of additive fluid which has been developed is manufactured under the trademark FLO ® by Chemlink Petroleum, Inc., a subsidiary of Atlantic Richfield Company, the assignee of the present invention. This type of drag reducing additive and certain other chemical additives injected into fluid transmission pipelines are relatively viscous oil-based additives but have very low lubricity characteristics. In this regard, the use of high pressure pumps for pressurizing the additive for injection into the main transmission line presents certain problems in regard to excessive metering pump wear and early failure. Moreover, the characteristics of the abovementioned types of drag reducing additives and certain other types of chemical additives are such that injection of these additives at high velocities tend to degrade the effectiveness of the substances. In this regard, it is desirable to inject the substance into the main transmission line, such as the pipeline 10, at a point downstream of the pipeline pumps in the direction of flow of the main fluid being transmitted through the pipeline.

As illustrated in FIG. 1, the additive injection system 13 of the present invention includes a branch conduit 14 connected to the pipeline section 11 downstream of the pump 12 and having interposed therein a suitable shut-off valve 16, a strainer or filter 18 for removing solid contaminants, and a pump 20 for increasing the pressure of fluid which is tapped off of the main pipeline section 11. The additive injection system 13 further includes a unique additive injection eductor 22 interposed in the branch conduit 14 and connected to a source of drag reducing additive, comprising a pressure vessel 24, by way of an injection conduit 26. The branch conduit 14 is also reconnected to the transmission line 10 through an injection and dispersion fitting or apparatus, generally designated by the numeral 28. A second manual shut-off valve 16 is preferably interposed in the conduit 14 between the apparatus 28 and the eductor 22.

The pressure vessel 24 is in communication with the eductor 22 through a suitable metering pump 30 interposed in the conduit 26. The metering pump 30 may be one of several types commercially available and in accordance with the present invention is required for metering the flow of drag reducing adddtives to the eductor 22 and is not required to substantially increase the pressure of the drag reducing additive for injection into the conduit 14 or the pipeline section 11.

Figure 2:
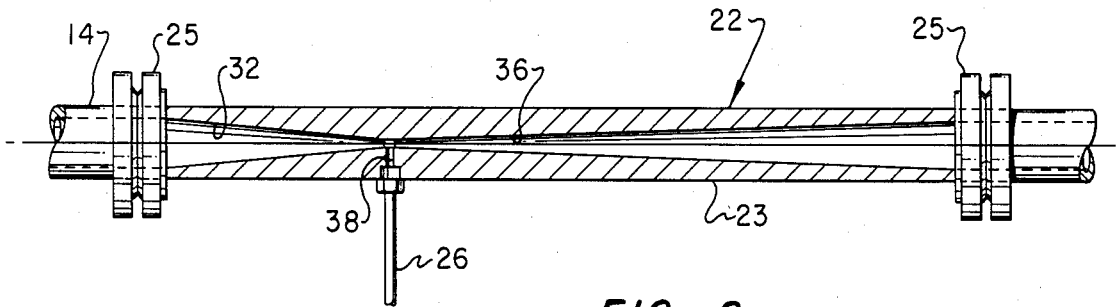
FIG. 2 is a longitudinal central section view of an improved eductor for use with the additive injection system illustrated in FIG. 1.
Figure 3:
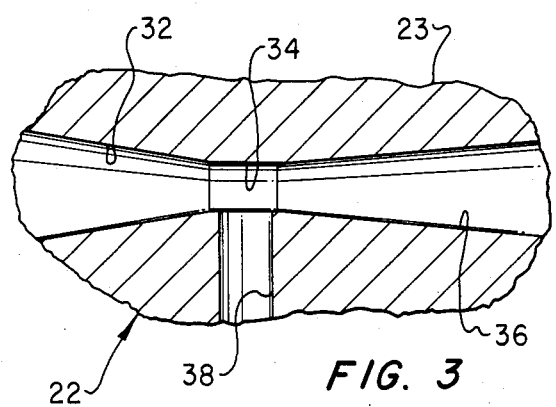
FIG. 3 is a detail section view of the throat portion of the eductor illustrated in FIG. 2.

Referring now to FIGS. 2 and 3, the eductor 22 preferably includes an elongated cylindrical housing 23 having suitable bolt-type slip-on flanges 25 secured to opposite ends thereof for connecting the eductor 22 to the conduit 14. The eductor 22 preferably includes a convergent nozzle portion 32, a throat 34, see FIG. 3 also, and a diffuser or divergent nozzle portion 36. An internal passage 38 opens into the throat 34 and is in communication with the drag reducing additive supply conduit 26. Accordingly, the relatively viscous drag reducing additive fluid may be injected into a diverted portion of the main transmission fluid utilizing a relatively low power pump, such as the pump 20, an eductor 22 and metering means, such as a metering pump 30 in communication with the source 24 of drag reducing additive. In this way, the drag reducing additive may be added to the transmission pipeline section 11 without pumping the drag reducing additive with a positive displacement pump under a high discharge pressure. The drag reducing additive may be premixed with a relatively small amount of transmission line fluid to assist in dispersing the drag reducing additive into the main fluid flow stream in the pipeline 10 and degradation of the drag reducing additive may be minimized. In this regard, the eductor 22 is configured to reduce the velocity of the fluid flow stream flowing through the converging and diverging nozzle portions of the eductor so that entry of the drag reducing additive into the eductor through the passage 38 results in acceleration of the drag reducing additive for only a very brief period of time as the velocity of the combined fluid flow stream in the diffuser portion 36 of the eductor reduces rapidly.

Figure 6:
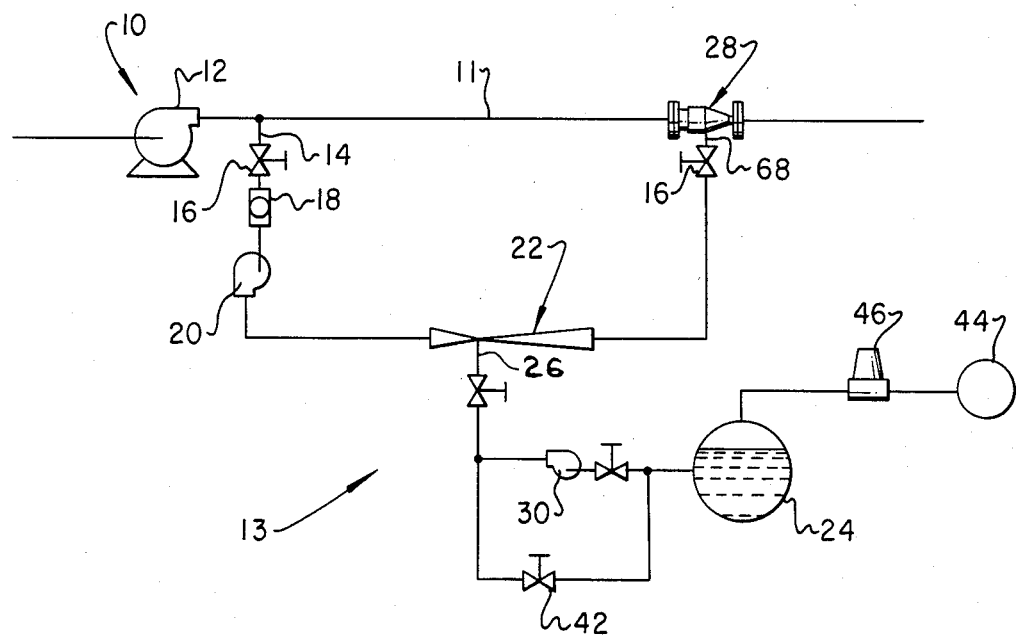
FIG. 6 is a schematic diagram of one alternate embodiment of an additive injection system according to the present invention.
Figure 7:
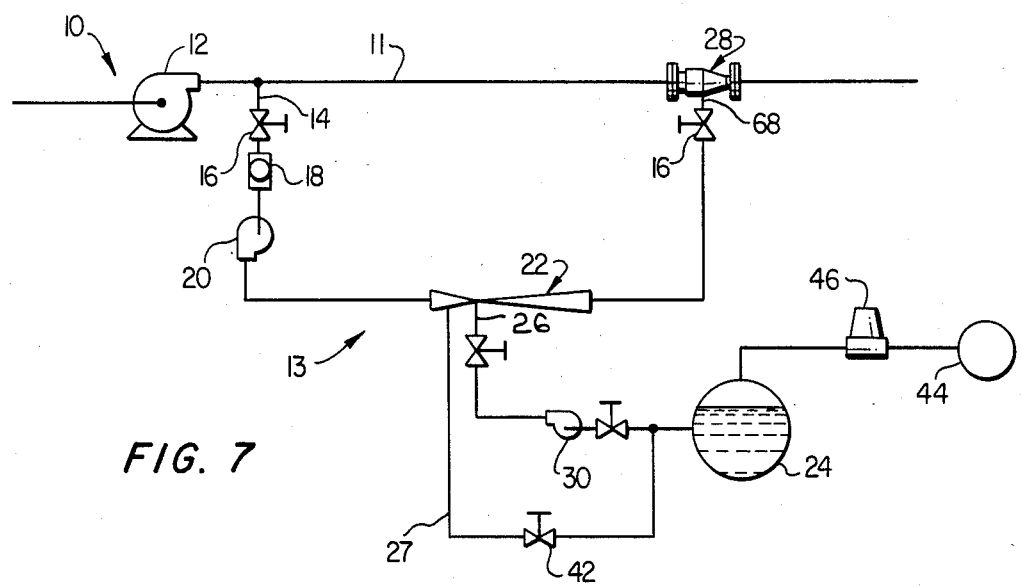
FIG. 7 is a schematic diagram of a second alternate embodiment of an additive injection system.
Figure 8:
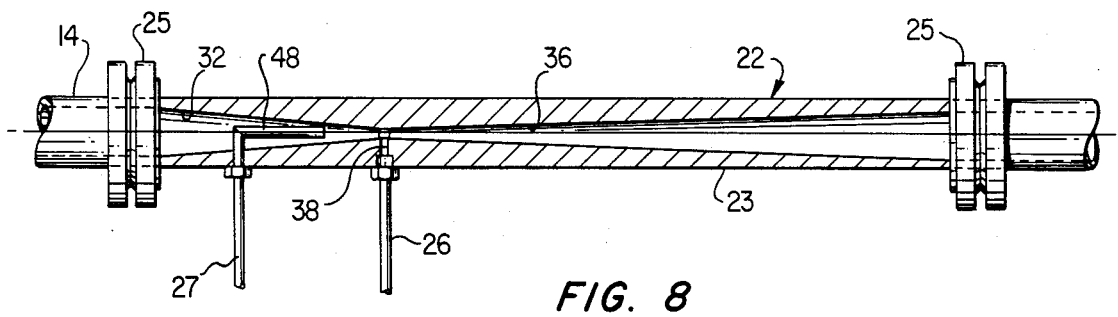
FIG. 8 is a section view similar to the section view of FIG. 2 showing the nozzle arrangement of the second alternate embodiment.
Figure 9:
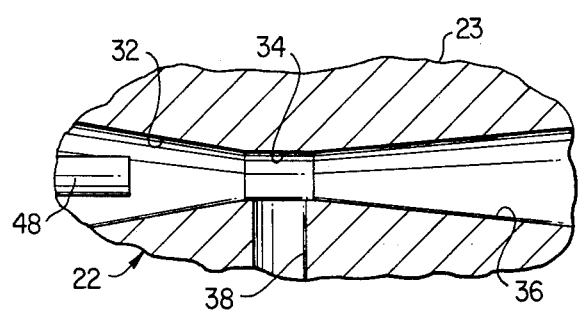
FIG. 9 is a detail view of the throat portion of the eductor illustrated in FIG. 8.

Referring further to FIG. 6 the drag reduction additive system 13 may be modified by the inclusion of a metering valve 42 interposed in the drag reducing additive supply conduit 26 between the source vessel 24 and the eductor 22 and bypassing the pump 30. The pressure vessel 24 may be pressurized with an inert gas supplied from a source 44 to the vessel 24 by way of a suitable pressure regulator 46 whereby a substantially constant supply pressure of drag reducing additive may be supplied to the metering valve 42 to eliminate the metering pump 30, if desired. Referring now to FIGS. 7, 8 and 9, further reduction in shear forces acting on the drag reducing additive as it is injected into the eductor 22 may be accomplished by providing a discharge nozzle 48, FIGS. 8 and 9, disposed substantially coaxial in the convergent nozzle portion 32 of the eductor 22 and in communication with the pressure vessel 24 by way of the metering valve 42 and an alternate supply conduit 27.

Figure 4:
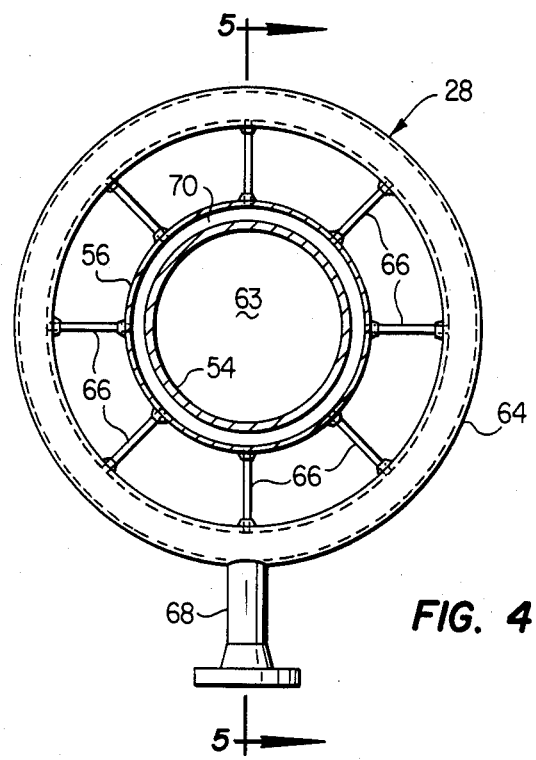
FIG. 4 is a transverse section view taken along line 4—4 of FIG. 5 of an improved drag reducing additive dispersion fitting for injecting a drag reducing additive directly into the main transmission pipeline.
Figure 5:
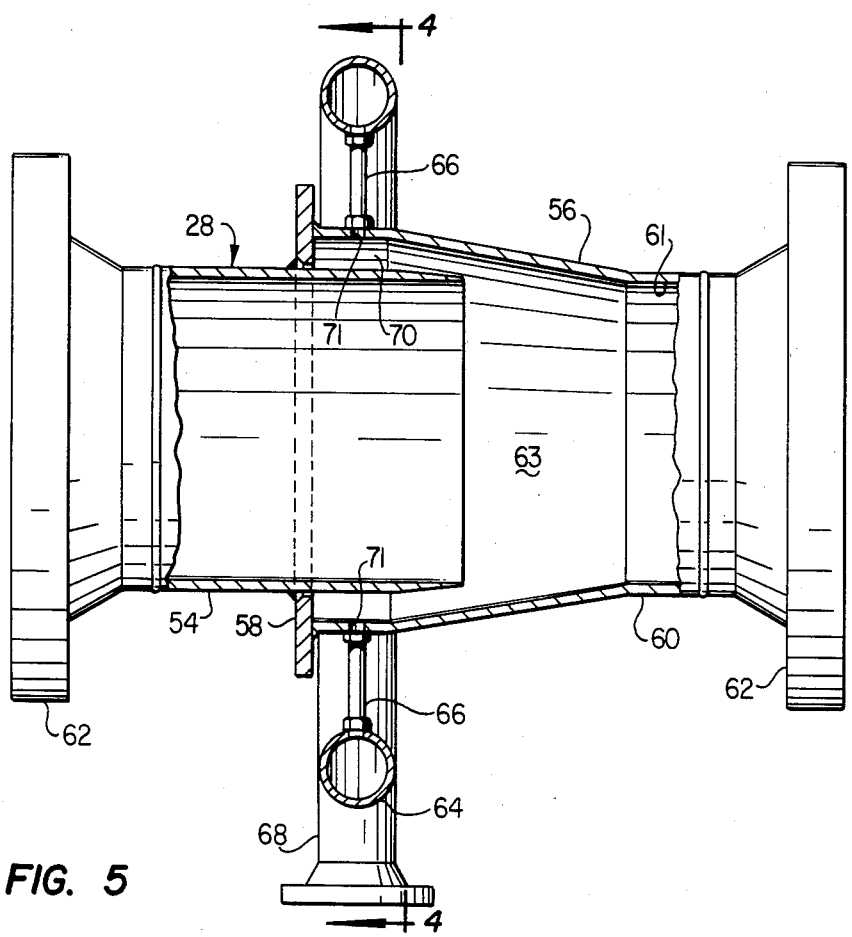
FIG. 5 is a longitudinal central section view taken along the line 5—5 of FIG. 4.

Referring now to FIGS. 4 and 5, the dispersion apparatus 28 for injecting the mixture of a relatively small amount of the main transmission line fluid with the drag reducing additive is characterized by a cylindrical nozzle member 54 which extends into a somewhat frustoconical shaped casing member 56, having a transverse end wall 58 and which converges toward a cylindrical fluid discharge conduit part 60. The nozzle portion 54 is suitable connected to a conventional pipe flange 62 as is the discharge part 60. A cylindrical manifold 64 is disposed around the member 56 and is supported relative thereto by a plurality of radially extending and circumferentially spaced injection conduits 66 which interconnect the member 56 with the manifold 64. A short inlet conduit 68 is connected to the manifold 64 and is adapted to be connected to the conduit 14 for conducting the mixture of drag reducing additive and main transmission pipeline fluid into the manifold 64 for injection into an annular dispersion chamber 70, FIG. 5, formed between the exterior of the nozzle member 54 and the member 56. The conduits 66 open into the dispersion chamber 70 through respective inlet ports 71.

The arrangement of the annular dispersion chamber 70 provides for dispersion of the drag reducing additive-pipeline fluid mixture into the main flow stream of the pipeline section 11 generally in a thin sheath along the boundary between the inner wall 61 of the pipeline flow passage 63 and the main body of fluid flowing through the pipeline section 11. Accordingly, the effectiveness of the drag reducing agent is increased by its dispersal at the boundary between the main body of pipeline fluid and the pipeline structure itself. The flow of fluid from the nozzle 54 into the passage 63 provides a slight pressure gradient between the passage 63 and the dispersion chamber 70 which enhances the flow of the additive fluid mixture into the main fluid flowstream. Moreover, the construction of the injection and dispersion apparatus 28 is such that there are no restrictions formed in the pipeline by the apparatus, and devices such as scraper pigs and other pipeline throughput devices may be traversed through the apparatus 28 without interfering with their operation or travel. The span between the distal end of the nozzle 54 and cylindrical discharge portion 60 of the dispersion member is maintained sufficiently short that there is little likelihood of skewing of any devices being traversed through the pipeline.

The drag reducing additive injection system 13 may, by way of example, be adapted for a 16" nominal diameter crude oil pipeline pumping crude oil at a pressure of approximately 900 psia wherein the branch conduit 14 is preferably a nominal 2½" diameter pipe connected to pump 20 and wherein the pressure in the branch conduit 14 upstream of the eductor 22 may be raised to a total pressure of approximately 1100 psia. The eductor 22 may, by way of example, be constructed of steel bar stock having an overall length of approximately 40" with a convergent nozzle portion 32 having an included convergence angle of approximately 10° and the diffuser portion 36 having an included angle of approximately 4°. The eductor 22 is preferably sized to provide for a maximum velocity of fluid at the nozzle throat to be approximately 400 ft./sec. to 450 ft./sec.

It is a characteristic of certain drag reducing additives, such as the additive manufactured under the trademark FLO ®, wherein high velocity flow of the pure or substantially pure additive material will not degrade at higher velocities but only after substantialy dissolution into fluids such as crude oil. Moreover, it has been observed that a time factor is relevant to the amount of degradation. Accordingly, injection of the drag reducing additive into the eductor 22 results in a very rapid deceleration of the mixture of the drag reducing additive and crude oil. For example, after entry of the drag reducing additive into the eductor throat 34 a reduction in fluid velocity in the diffuser portion 36 occurs such so that, for the parameters given above, the velocity of the drag reducing additive is substantially reduced within about 0.10 seconds.

Accordingly, a premixing of drag reducing adidtive with a small amount of main transmission pipeline fluid utilizing the injection sysem 13 overcomes several problems mentioned hereinabove in the art of injecting drag reducing additives and certain other pipeline additives. By injecting the additive at a metered rate without increasing the pressure of the additive substantially through a positive displacement or other form of mechanical pump, problems associated with pump wear and failure are avoided. Moreover, the injection system 13 is mechanically uncomplicated and provides for precise mixing and dispersal of drag reducing additives into fluid transmission pipelines.

Although a preferred embodiment of the present invention has been described hereinabove in detail, those skilled in the art will recognize that various substitutions and modifications may be made to the specific embodiment described without departing from the scope and spirit of the invention recited in the appended claims.

What I claim is:

1. A system for injecting a fluid additive into a fluid transmission pipeline comprising:
    a branch conduit in communication with said pipeline for withdrawing a predetermined amount of pipeline fluid from said pipeline;
    pump means interposed in said branch conduit for increasing the pressure of said pipeline fluid flowing through said branch conduit;
    a source of additive fluid;
    conduit means interconnecting said source of additive fluid with said branch conduit containing said pipeline fluid including means for metering additive fluid into said branch conduit;
    apparatus in communication with said branch conduit and interposed said pipeline for injecting a mixture of said pipeline fluid and said additive fluid received from said branch conduit into said pipeline, said apparatus comprising a nozzle portion characterized by cylindrical member defining a substantially constant diameter flow path and a cylindrical reducing section formed by a converging member which converges toward a cylindrical fluid conduit part disposed downstream of said nozzle portion with respect to the direction of flow of fluid in said pipeline, said converging member forming a passage in communication with the distal end of said nozzle portion to define an annular dispersion chamber and to provide a substantially uninterrupted flow path for pipeline fluid and devices filling substantially the entire cross-sectional area of said pipeline and which are traversable through said pipeline and said apparatus; and
    conduit means for injecting said mixture of additive fluid and pipeline fluid at circumferentially spaced apart points into said dispersion chamber so that said mixture of additive fluid and pipeline fluid is dispersed along said converging member and into said pipeline adjacent the inner wall surface of said pipeline.

2. The system set forth in claim 1 including:
    means interposed in said branch conduit for injecting said additive fluid into said branch conduit at a pressure less than the pressure in said pipeline.

3. The system set forth in claim 2 wherein:
    said means for injecting said additive fluid into said pipeline fluid comprises an eductor having a convergent nozzle portion and means forming a passage for injection of said additive fluid into said eductor at a pressure less than the pressure of said pipeline fluid in said conduit.

4. The system set forth in claim 3 wherein:
    said eductor includes a divergent nozzle portion for decelerating the flow of additive fluid-pipeline fluid mixture prior to injection into said pipeline.

5. The system set forth in claim 3 wherein:
    said eductor includes an additive fluid injection nozzle disposed upstream of said throat with respect to the direction of flow of said pipeline fluid through said eductor means.

6. The system set forth in claim 1 wherein:

said source of additive fluid includes a pressure vessel and means for pressurizing said additive fluid in said pressure vessel; and said means for metering said additive fluid flowing through said conduit means includes an adjustable metering valve interposed in said conduit means between said pressure vessel and said branch conduit.

7. The system set forth in claim 1 wherein:

said means for metering said additive fluid includes positive displacement pump means operable to meter a predetermined flow rate of said additive fluid flowing to said branch conduit.

* * * * *